US010766807B2

(12) United States Patent
Fan et al.

(10) Patent No.: US 10,766,807 B2
(45) Date of Patent: Sep. 8, 2020

(54) MACHINABLE AND CHEMICALLY TOUGHENABLE FLUORINE GLASS-CERAMIC

(71) Applicant: SCHOTT GLASS TECHNOLOGIES (SUZHOU) CO. LTD., Jiang Su (CN)

(72) Inventors: Huiyan Fan, Suzhou (CN); Junming Xue, Suzhou (CN); Jose Zimmer, Losheim am See (DE); Chong Wang, Suzhou (CN); Wenliang Ping, Suzhou (CN)

(73) Assignee: SCHOTT Glass Technologies (Suzhou) Co. Ltd., Jiang Su (CN)

( * ) Notice: Subject to any disclaimer, the term of this patent is extended or adjusted under 35 U.S.C. 154(b) by 174 days.

(21) Appl. No.: 15/688,258

(22) Filed: Aug. 28, 2017

(65) Prior Publication Data
US 2018/0044225 A1 Feb. 15, 2018

Related U.S. Application Data

(63) Continuation of application No. PCT/CN2016/074785, filed on Feb. 29, 2016.

(30) Foreign Application Priority Data
Feb. 28, 2015 (CN) .......................... 2015 1 0091475

(51) Int. Cl.
C03C 10/16 (2006.01)
C03C 21/00 (2006.01)
(Continued)

(52) U.S. Cl.
CPC .............. *C03C 10/16* (2013.01); *C03B 27/03* (2013.01); *C03C 3/112* (2013.01); *C03C 4/18* (2013.01);
(Continued)

(58) Field of Classification Search
CPC ............ A61K 6/0273; A61C 13/083;qa C03C 10/0009; C03C 10/0018
(Continued)

(56) References Cited

U.S. PATENT DOCUMENTS 3,689,293 A 9/1972 Beall
3,732,087 A 5/1973 Grossman
(Continued)

FOREIGN PATENT DOCUMENTS

CA 2239861 12/1998
CN 1880251 12/2006
(Continued)

OTHER PUBLICATIONS

International Search Report dated Jun. 1, 2016 for corresponding PCT/CN2016/074785, 4 pages.
(Continued)

*Primary Examiner* — Hoa (Holly) Le
(74) *Attorney, Agent, or Firm* — Ohlandt, Greeley, Ruggiero & Perle, L.L.P.

(57) ABSTRACT

The present invention is directed to a kind of machinable glass ceramic which can be chemically toughened. The machinable and chemically toughenable glass ceramic, which comprises, as represented by weight percentage based on the following compositions, 25-75 wt % of $SiO_2$, 6-30 wt % of $Al_2O_3$, 0.1-30 wt % of $Na_2O$, 0-15 wt % of $K_2O$, 0-30 wt % of $B_2O_3$, 4-35 wt % of MgO, 0-4 wt % of CaO, 1-20 wt % of F, 0-10 wt % of $ZrO_2$, 0.1-10 wt % of $P_2O_5$, 0-1 wt % of $CeO_2$ and 0-1 wt % of $SnO_2$, wherein $P_2O_5+Na_2O>3$ wt %, and $Al_2O_3+Na_2O+P_2O_5>17$ wt %. Mica crystalline phase can be formed in the glass ceramic and the glass ceramic can be chemically toughened by one step, two steps or multiple steps with depth of K-ion layer of at least 15 μm and surface compress stress of at least 300 MPa. The profile
(Continued)

on depth of the ion exchange layer follows the complementary error function. Hardness can be improved by at least 20% after chemical toughening. The dimension deviation ratio is less than 0.06% by ion-exchanging.

31 Claims, 6 Drawing Sheets

(51) Int. Cl.
 C03C 3/112 (2006.01)
 C03B 27/03 (2006.01)
 C03C 4/18 (2006.01)
 C03C 10/00 (2006.01)
(52) U.S. Cl.
 CPC ...... *C03C 10/0045* (2013.01); *C03C 10/0054* (2013.01); *C03C 21/002* (2013.01); *C03C 21/005* (2013.01); *C03C 2204/02* (2013.01)
(58) Field of Classification Search
 USPC ............... 501/55, 57, 58, 59, 63, 66, 69, 70
 See application file for complete search history.

(56) References Cited

U.S. PATENT DOCUMENTS

| | | |
|---|---|---|
| 3,756,838 A | 9/1973 | Beall |
| 3,801,295 A | 4/1974 | Beall |
| 3,839,005 A | 10/1974 | Meyer |
| 3,839,055 A | 10/1974 | Grossman |
| 3,985,531 A | 10/1976 | Grossman |
| 3,997,352 A | 12/1976 | Beall |
| 4,111,708 A | 9/1978 | Flannery |
| 4,341,543 A | 7/1982 | Andrus |
| 4,390,634 A | 6/1983 | Hoda |
| 4,414,281 A | 11/1983 | Hoda |
| 4,536,452 A | 8/1985 | Stempin |
| 4,624,933 A | 11/1986 | Beall |
| 4,789,649 A | 12/1988 | Abert |
| 6,375,729 B1 | 4/2002 | Brodkin |
| 6,645,285 B2 | 11/2003 | Brodkin |
| 7,666,511 B2 * | 2/2010 | Ellison .................... C03B 17/06 428/426 |
| 8,048,816 B2 | 11/2011 | Beall |
| 8,298,970 B2 | 10/2012 | Beall |
| 9,134,445 B2 | 9/2015 | Kragh |
| 2008/0254965 A1 | 10/2008 | Ishioka |
| 2009/0003656 A1 | 1/2009 | Reinhard |
| 2009/0274869 A1 | 11/2009 | Beall |
| 2009/0318277 A1 | 12/2009 | Beall |
| 2011/0092353 A1 | 4/2011 | Amin |
| 2011/0111944 A1 | 5/2011 | Hsu |
| 2011/0319253 A1 | 12/2011 | Beall |
| 2013/0224492 A1 | 8/2013 | Bookbinder |
| 2014/0134397 A1 | 5/2014 | Amin |
| 2014/0194270 A1 | 7/2014 | Shiratori |

FOREIGN PATENT DOCUMENTS

| | | |
|---|---|---|
| CN | 102050581 | 5/2011 |
| CN | 102089252 | 6/2011 |
| DE | 2815312 | 12/1978 |
| DE | 3306648 | 9/1983 |
| JP | S62108750 | 5/1987 |
| JP | H1121145 | 1/1999 |
| JP | 2007246297 | 9/2007 |
| JP | 2013071878 | 4/2013 |
| KR | 20040006192 | 1/2004 |
| WO | 2009134415 | 11/2009 |
| WO | 2010008443 | 1/2010 |
| WO | 2013011897 | 1/2013 |
| WO | 2013130653 | 9/2013 |

OTHER PUBLICATIONS

Written Opinion of the International Searching Authority dated Jun. 1, 2016 for corresponding PCT/CN2016/074785, 4 pages.
Mauro, et al., "Glass Science in the United States: Current Status and Future Directions", International Journal of Applied Glass Science, No. 5, vol. 1, pp. 2-15, Science and Technology Division, Corning Incorporated, 2014 Corning, New York.
International Preliminary Report on Patentability dated Sep. 5, 2017 for corresponding PCT/CN2016/074785, 5 pages.

* cited by examiner

MACHINABLE AND CHEMICALLY TOUGHENABLE FLUORINE GLASS-CERAMIC

CROSS-REFERENCE TO RELATED APPLICATION

The present application claims the benefit of International Patent Application No. PCT/CN2016/074785, filed on Feb. 29, 2017, which in turn claims priority to Chinese patent application no. 201510091475.0, filed on Feb. 28, 2015.

BACKGROUND OF THE DISCLOSURE

1. Field of the Disclosure

The present disclosure is directed to a machinable and chemically toughenable glass ceramic with excellent machinable properties, which exhibit improved strength by chemical toughening. Specifically, the present disclosure relates to a fluorine mica glass-ceramic composition and a machinable glass ceramic produced from the fluorine mica glass-ceramic composition, with the machinable glass ceramic being doped with $P_2O_5$ and $Na_2O$, characterized in that $P_2O_5+Na_2O>3$ wt %, and $Al_2O_3+Na_2O+P_2O_5>17$ wt %, wherein mica crystalline phase can be formed and the glass ceramic can be chemically toughened by one step or multiple steps.

2. Discussion of the Related Art

Glass ceramic can find very broad applications in the fields of mechanical engineering, electrical engineering and electronics, lighting and optics, aerospace engineering, nuclear engineering, biomedical and the like due to its excellent physical properties, such as high mechanical strength, high dielectric breakdown strength, high resistivity, outstanding high-temperature resistance, high deformation resistance, high abrasion resistance, high dimensional stability and excellent thermal shock resistance. However, non-metallic materials of this type are inherently hard and brittle in nature. Due to absence of toughness and ductility exhibited by metallic materials such as copper, aluminum, iron, etc., most glass ceramic cannot be subjected to machining processing such as turning, miling, shaving, sawing, drilling, grinding by means of conventional machining tools. In cases that components and parts with specific or complicated shapes are desired, very high costs for forming and processing are necessary, and even some glass ceramic materials cannot be subjected to such machining processing at all. Whether broad popularization and application of glass ceramic materials can be achieved, depends on whether glass ceramic materials can be processed as easily as common metals. In this context, increasing attention is turning to machinable glass ceramic. Many companies such as Schott, Corning and AMC are making increasingly effort of study and development in this regard.

In principle, any glass and ceramic can be subjected to machining processing such as grinding, polishing, and sawing with a carborundum saw bit. The so-called "machinable" glass ceramic here is intended to mean that the glass ceramic is similar to metals and can be subjected to machining processing at different levels by means of machinery for processing common metals. In other words, conventional machining tools can be used for carrying out conventional machining means, such as turning, miling, shaving, sawing, drilling, grinding, threading or the like, so as to produce components and parts with accurate tolerance and desired shape and surface smoothness. Such processing made to conventional glass or glass ceramic results in explosion or rupture of work pieces.

Machinable glass ceramic greatly reduces the costs for processing. The machinable performances break boundaries between metal processing and gals, ceramic processing, and then extend application fields of gals and ceramic materials.

In general, machinable glass ceramic means glass ceramic with mica as its main crystalline phase. The machinable performances results from mica phase present in microstructure of the machinable glass ceramic. The mica phase is easy to cleavage and dispersed and distributed in the glass matrix. It is well known that mica is a layered silicate and generally possesses characteristic in sheet form, which exhibit outstanding cleavability at the (001) plane. Among others, as for general phlogopite structure, it is characterized in that double-layer groups are linked loosely to each other in general by means of potassium ions or sodium ions, and each of the double-layer groups consists of two single-layer group $[Si_2O_5]^{2-}$ which are linked firmly to each other, with the insides of the double-layer group firmly aggregating together by magnesium ions and fluorine ions. Cleavage processes inside the (001) plane extend rapidly (excellent cleavability). This is the mechanism for machinable performances of machinable glass ceramic with mica structure.

In general, a rapidly extending cleavage in linear manner results in particularly easy explosion or rupture of a glass body. However, the cleavage always extends along the (001) direction and gets across other adjacent mica crystals in the case of mica glass ceramic, resulting in changes in the extending direction and then cut-off of the cleavage. Therefore, the explosion or rupture of the glass ceramic is prevented.

A plurality of machinable glass ceramic have been reported in the prior art. For example, U.S. Pat. Nos. 3,756,838A, 4,390,634, 4,536,452A and DE 2815312A1 disclosed an alkali earth mica glass ceramic which is alkali-free. The glass ceramic has low strength and cannot be chemically toughened to improve its strength.

U.S. Pat. No. 4,624,933 and U.S. Ser. No. 09/134,445 disclosed a sodium-containing mica glass ceramic which is free of $P_2O_5$, wherein mechanical properties are not mentioned at all.

WO 10008443 disclosed a machinable glass ceramic with high mechanical strength (MOR>150 MPa), which is free of sodium and cannot be chemically toughened.

U.S. Pat. No. 4,789,649 disclosed a micaceous-cordierite glass ceramic with high fracture toughness (K1c>2 $MPam^{0.5}$) and high hardness (Hv0.07 300-1000). However, the machinable properties will be weakened due to cordierite.

Machinable glass ceramic exhibits good implementation and application prospect in many fields. However, machinable glass ceramic reported in the prior art has low hardness, strength, abrasive resistance and bending strength. Low strength and low mechanical strength are main restraining factors for popularization and application of machinable glass ceramic, which limits applications of machinable glass ceramic in many fields and limits development of machinable glass ceramic to some extent. How to improve the mechanical performances of machinable glass ceramic has become a hot topic in current studies of machinable glass ceramic.

Machinable glass ceramic reported in the prior art is mainly focused on the aspect of fluorine mica glass ceramic.

However, fluorine mica glass ceramic which can be chemically toughened to improve its strength has not been reported.

In the present disclosure, the inventors have designed and developed a kind of machinable glass ceramic, which can be processed to all kinds of complex shapes. Then the machinable glass ceramic can be easily chemical toughened to improve hardness and mechanical strength.

SUMMARY OF THE DISCLOSURE

The present disclosure is therefore to resolve the following technical problems in the prior art: machinable glass ceramic can be easily processed into complicated shapes due to its low toughness and low strengthen. However, the low mechanical strengthen also limits the applications fields of machinable glass ceramic. For this reason, it is very important to improve the mechanical strengthen after standard machining processes.

According to the present disclosure, the above technical problem has been resolved by a $Na_2O$- and $P_2O_5$-containing mica glass ceramic with excellent machinable properties, which can be chemically toughened by ion exchanging. The glass ceramic can be chemically toughened to improve its mechanical strength (at least one of hardness, strength, indentation and anti-scratch properties).

The aim of the present disclosure is to provide a machinable glass ceramic with excellent chemically toughenable properties and articles thereof, and to provide a fluorine mica glass-ceramic composition suitable for producing such machinable glass ceramic.

The present disclosure discloses a $P_2O_5$ and $Na_2O$ doped machinable glass ceramic with mica phase ceramization, which can be chemically toughened to improve mechanical strength, for example, including hardness, strength, indentation, anti-scratch properties and the like.

According to the first aspect of the present disclosure, provided is a fluorine mica glass-ceramic composition which can be chemically toughened, wherein $P_2O_5+Na_2O>3$ wt %, and $Al_2O_3+Na_2O+P_2O_5>17$ wt %, as calculated from batches based on oxides.

Preferably, the fluorine mica glass-ceramic composition which can be chemically toughened comprises the following compositions, as calculated from batches based on oxides:
$SiO_2$: 25-75 wt %;
$Al_2O_3$: 6-30 wt %;
$Na_2O$: 0.1-30 wt %;
$K_2O$: 0-15 wt %;
$B_2O_3$: 0-30 wt %;
MgO: 4-35 wt %;
CaO: 0-4 wt %;
F: 1-20 wt %;
$ZrO_2$: 0-10 wt %;
$P_2O_5$: 0.1-10 wt %;
$CeO_2$: 0-1 wt %;
$SnO_2$: 0-1 wt %.

Further preferably, the fluorine mica glass-ceramic composition which can be chemically toughened comprises the following compositions, as calculated from batches based on oxides:
$SiO_2$: 30-70 wt %;
$Al_2O_3$: 7-29 wt %;
$Na_2O$: 0.5-15 wt %;
$K_2O$: 0.5-12 wt %;
$B_2O_3$: 0.1-20 wt %;
MgO: 4-25 wt %;
CaO: 0-2 wt %;
F: 1-15 wt %;
$P_2O_5$: 0.5-9 wt %;
$ZrO_2$: 0-8 wt %;
$CeO_2$: 0-0.5 wt %;
$SnO_2$: 0-0.5 wt %.

Further preferably, the fluorine mica glass-ceramic composition which can be chemically toughened comprises the following compositions, as calculated from batches based on oxides:
$SiO_2$: 35-65 wt %;
$Al_2O_3$: 8-27 wt %;
$Na_2O$: 1-15 wt %;
$K_2O$: 1-11 wt %;
$B_2O_3$: 1-20 wt %;
MgO: 4-20 wt %;
CaO: 0-1.5 wt %;
F: 2-12 wt %;
$P_2O_5$: 1-8 wt %;
$ZrO_2$: 0-6 wt %;
$CeO_2$: 0-0.3 wt %;
$SnO_2$: 0-0.3 wt %.

Particularly preferably, the fluorine mica glass-ceramic composition which can be chemically toughened comprises the following compositions, as calculated from batches based on oxides:
$SiO_2$: 40-65 wt %;
$Al_2O_3$: 8-26 wt %;
$Na_2O$: 3-14 wt %;
$K_2O$: 2-10 wt %;
$B_2O_3$: 1-17 wt %;
MgO: 4-17 wt %;
CaO: 0-1 wt %;
F: 5-10 wt %;
$P_2O_5$: 1-7 wt %;
$ZrO_2$: 0-6 wt %;
$CeO_2$: 0-0.2 wt %;
$SnO_2$: 0-0.2 wt %.

In some particularly preferred embodiments according to the present disclosure, the fluorine mica glass-ceramic composition which can be chemically toughened consists of the compositions as listed above.

According to the second aspect of the present disclosure, provided is a machinable glass ceramic which can be chemically toughened, wherein the machinable glass ceramic is doped with $P_2O_5$ and $Na_2O$, characterized in that $P_2O_5+Na_2O>3$ wt %, and $Al_2O_3+Na_2O+P_2O_5>17$ wt %

According to the present disclosure, mica crystalline phase can be formed in the machinable glass ceramic which can be chemically toughened.

In some embodiments according to the present disclosure, the machinable glass ceramic which can be chemically toughened is produced from the fluorine mica glass-ceramic composition which can be chemically toughened as mentioned above.

According to the present disclosure, the machinable glass ceramic which can be chemically toughened preferably comprises the following compositions:
$SiO_2$: 25-75 wt %;
$Al_2O_3$: 6-30 wt %;
$Na_2O$: 0.1-30 wt %;
$K_2O$: 0-15 wt %;
$B_2O_3$: 0-30 wt %;
MgO: 4-35 wt %;
CaO: 0-4 wt %;
F: 1-20 wt %;
$ZrO_2$: 0-10 wt %;
$P_2O_5$: 0.1-10 wt %;

$CeO_2$: 0-1 wt %;
$SnO_2$: 0-1 wt %.

In some preferred embodiments according to the present disclosure, the machinable glass ceramic which can be chemically toughened preferably comprises the following compositions:

$SiO_2$: 30-70 wt %;
$Al_2O_3$: 7-29 wt %;
$Na_2O$: 0.5-15 wt %;
$K_2O$: 0.5-12 wt %;
$B_2O_3$: 0.1-20 wt %;
MgO: 4-25 wt %;
CaO: 0-2 wt %;
F: 1-15 wt %;
$P_2O_5$: 0.5-9 wt %;
$ZrO_2$: 0-8 wt %;
$CeO_2$: 0-0.5 wt %;
$SnO_2$: 0-0.5 wt %.

Further preferably, the machinable glass ceramic which can be chemically toughened comprises the following compositions:

$SiO_2$: 35-65 wt %;
$Al_2O_3$: 8-27 wt %;
$Na_2O$: 1-15 wt %;
$K_2O$: 1-11 wt %;
$B_2O_3$: 1-20 wt %;
MgO: 4-20 wt %;
CaO: 0-1.5 wt %;
F: 2-12 wt %;
$P_2O_5$: 1-8 wt %;
$ZrO_2$: 0-6 wt %;
$CeO_2$: 0-0.3 wt %;
$SnO_2$: 0-0.3 wt %.

Particularly preferably, the machinable glass ceramic which can be chemically toughened comprises the following compositions:

$SiO_2$: 40-65 wt %;
$Al_2O_3$: 8-26 wt %;
$Na_2O$: 3-14 wt %;
$K_2O$: 2-10 wt %;
$B_2O_3$: 1-17 wt %;
MgO: 4-17 wt %;
CaO: 0-1 wt %;
F: 5-10 wt %;
$P_2O_5$: 1-7 wt %;
$ZrO_2$: 0-6 wt %;
$CeO_2$: 0-0.2 wt %;
$SnO_2$: 0-0.2 wt %.

In some particularly preferred embodiments according to the present disclosure, the machinable glass ceramic which can be chemically toughened consists of the compositions as listed above. According to the present disclosure, the fluorine mica glass-ceramic has a porosity of 0%, has greater than 40 Vol. % of crystalline phase and interlock crystallization structure can be formed, wherein the mica crystalline size is 5-100 μm with aspect ratio <0.5; alternatively, fluoromica crystal with preferred lateral direction or cabbage-head shape can be formed in the fluorine mica glass-ceramic and the size of crystal grains of the fluoromica crystal is >5 μm, >10 μm, or >15 μm.

According to the present disclosure, before the chemically toughing, the machinable glass ceramic which can be chemically toughened exhibits an Hv hardness of higher than 200 $kg/mm^2$. In some embodiments of the present disclosure, the machinable glass ceramic which can be chemically toughened exhibits an Hv hardness of higher than 250 $kg/mm^2$.

According to the third aspect of the present disclosure, provided is a chemically toughened machinable glass ceramic, which is produced by chemical toughing the machinable glass ceramic as described above.

According to the present disclosure, after the chemically toughing, the machinable glass ceramic exhibits a hardness of higher than 300 $kg/mm^2$. In some particularly preferred embodiments according to the present disclosure, the chemically toughened machinable glass ceramic exhibits an Hv hardness of higher than 350 $kg/mm^2$.

Preferably, the hardness of the chemically toughened machinable glass ceramic is improved by 20% or more, 25% or more or 30% or more than that before the chemically toughing.

In some embodiments according to the present disclosure, the chemically toughened machinable glass ceramic has depth of K ion layer of >15 μm, >20 μm, or >25 μm, and compress stress CS>300 MPa, >350 MPa or >400 MPa.

In some embodiments according to the present disclosure, the size deviation of the glass ceramic is <0.06%, <0.05%, or <0.04% after chemical toughening.

The chemically toughened machinable glass ceramic has excellent anti-scratch properties after chemical toughening. The width and depth of scratch can be reduced by 10% or more, or 20% or more.

The mica glass-ceramic and the mica glass-ceramic articles produced from the composition exhibit excellent machinable performances when processed with steel tools, and can be chemically toughened by ion-exchanging to exhibit excellent mechanical strength, moderate thermal expansion and hardness, and good chemical durability.

According to one embodiment of the present disclosure, the chemically toughened machinable glass ceramic as described above exhibit size of deformation of less than 0.06% after the chemical toughing and is able to be processed into any shapes, for example shapes used on solder tips, 3D mold or insulation compositions.

Technical feasibility of the chemically toughened machinable glass ceramic according to the present disclosure has been verified: the depth of the ion-exchanging layer is higher than 20 μm in sodium-containing, chemically toughened and machinable glass ceramic, Hv is increased by 26% and the anti-scratch properties can be improved. According to the present disclosure, the glass ceramic which can be chemically toughened exhibit excellent hardness, strength and/or anti-scratch properties, and such properties can be further improved greatly by chemical toughing.

Therefore, the fluorine mica glass-ceramic composition which can be chemically toughened, the machinable glass ceramic or the chemically toughened machinable glass ceramic according to the present disclosure are suitable for use in the following application fields:

Components for aerospace applications,
Equipment for the medical industry,
Vacuum Environment feedthroughs, such as insulators and supports,
Headers, windows and spacers for use within microwave tube devices,
Microscope sample holders,
Welding nozzles,
High temperature 3D mold,
Heat insulation component,
Solder tip, and
Backside cover for electronics devices, such as cell phone protective cover, computer backboard and frame of screening.

BRIEF DESCRIPTION OF THE DRAWINGS

FIG. 1, SEM and XRD on phase separation to form a body-centered cubic form of chondrodite; FIG. 2, SEM and XRD of norbergite; FIG. 3, SEM and XRD on epitaxial manner; and FIG. 4, SEM on phlogopite phase, exhibiting an interlock crystallization structure or a morphology of preferred lateral direction or cabbage-head shape.

DETAILED DESCRIPTION OF THE DISCLOSURE

Figure 1:
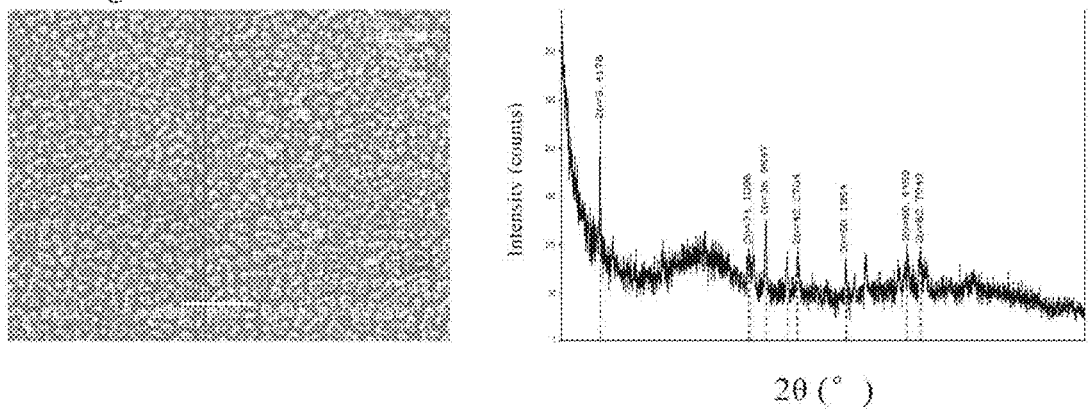
FIGS. 1 to 4 show XRD and SEM of the machinable glass ceramic (mica is formed)) according to one embodiment of the present disclosure during different stages of its production.
Figure 2:
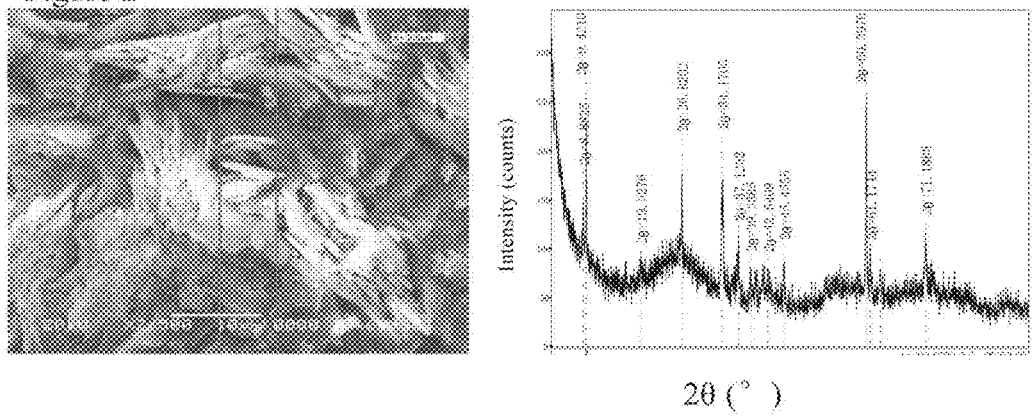
Figure 3:
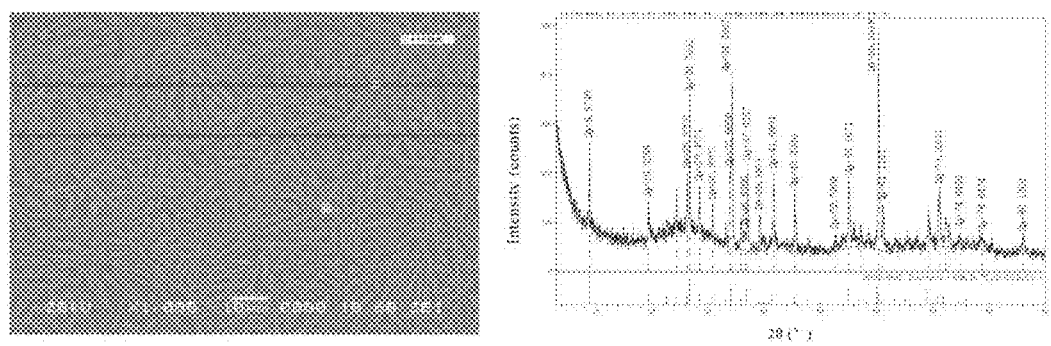

In the present disclosure, the expression "consist of" is intended to mean than in addition to inevitable impurities, only the compositions as listed are comprised, that is to say, no additional compositions are introduced intentionally.

In the glass ceramic composition according to the present disclosure, $SiO_2$ is the largest constituent of the glass ceramic composition and therefore, it is the largest primary constituent of the glass network. $SiO_2$ is important for the resistance of the glass ceramic on the one hand that can be increased with an increasing amount of $SiO_2$. A higher content of $SiO_2$ may increase the durability and mechanical strength of the glass ceramic, but it is also important to the melting capabilities on the other hand, wherein the formability may be diminished with higher concentrations of more than 75 mol %. Therefore, it is advantageous in the technical solutions of the present disclosure that the amount of $SiO_2$ is limited within the following ranges: 25-75 wt. %, preferably 30-70 wt. %, particularly preferably 35-65 wt. %, in particular 40-65 wt. %.

$Al_2O_3$ is also an important constituent for the glass ceramic composition according to the present disclosure since it may facilitate the ion exchange on the glass surface. A larger exchange depth of the ion exchange is favorable for the scratch-tolerance of the glass. In addition, it is an essential component for improving the chemical stability. Also, it may increase hardness of the glass. But, on the other hand, if the amount of $Al_2O_3$ is too high, the melting temperature may increase and the resistance to acids may decrease. Therefore, it is advantageous in the technical solutions of the present disclosure that the amount of $Al_2O_3$ is limited within the following ranges: 6-30 wt. %, preferably 7-29 wt. %, more preferably 8-27 wt. %, in particular 8-26 wt. %.

$B_2O_3$ exerts a very positive influence on the scratch-tolerance of the glass ceramic or glass ceramic article, respectively. Also, it is favorable to the melting properties of the glass ceramic. But, it may negatively influence the ion exchange. Therefore, it is significantly important for the glass ceramic or glass ceramic article of the disclosure to appropriately adjust the amount of $B_2O_3$ to achieve desirable balance among scratch-tolerance, melting property and ion-exchanging performance. The inventors have found that it is advantageous in the technical solutions of the present disclosure that the amount of $B_2O_3$ is limited within the following ranges: 0-30 wt. %, preferably 0.1-20 wt. %, particularly preferably 1-20 wt. %, in particular 2-17 wt. %.

The glass ceramic composition also comprises alkali oxides $R_2O$, wherein $R_2O$ is at least one of $Na_2O$ and $K_2O$ since the glass ceramic composition is substantially free of Li. The glass composition in accordance to the disclosure also comprises alkaline earth oxides R'O, wherein R'O is at least one of MgO, CaO, SrO, ZnO and BaO. R'O as well as $R_2O$ are network transformers and therefore favorable to the melting properties of the glass ceramic.

The existence of Sodium ions, Potassium ions and $P_2O_5$ is of high importance to the ion exchange; a glass ceramic without alkali oxides is not suitable for chemical toughening. Potassium ions are advantageous for the improvement in the exchange depth. Therefore, $K_2O$ may be present to a specific amount within the glass ceramic composition. It has been found that a higher content of $Na_2O$ is also favorable for forming processes, in particular for floating or down-drawing. If the content of $Na_2O$ and $K_2O$ is too high, however, the glass viscosity may decrease. Therefore, the content of alkali oxides is carefully matched with the content of alkaline earth oxides.

The existence of alkaline earth oxides R'O may improve the melting behavior by stabilizing the glass ceramic. MgO may not greatly affect the ion exchange by moderate use, wherein heavier constituents CaO, SrO or BaO as well as ZnO may influence the ion-exchange more, especially, if the content increases up to 4 wt. %. In some preferred embodiments of the present disclosure, the glass ceramic composition and the articles produced therefrom contains no alkaline earth oxides CaO, SrO, BaO and ZnO.

In embodiments of the present disclosure, the amount of $Na_2O$ is 0.1-30 wt. %, preferably 0.5-15 wt. %, particularly preferably 1-15 wt. %, in particular 3-14 wt. %; the amount of $K_2O$ is 0-15 wt. %, preferably 0.5-12 wt. %, particularly preferably 1-11 wt. %, in particular 2-10 wt. %; the amount of $P_2O_5$ is 0.1-10 wt. %, preferably 0.5-9 wt. %, particularly preferably 1-8 wt. %, in particular 1-7 wt. %; the amount of MgO is 4-35 wt. %, preferably 4-25 wt. %, particularly preferably 4-20 wt. %, in particular 4-17 wt. %; the amount of CaO is 0-4 wt. %, preferably 0-2 wt. %, particularly preferably 0-1.5 wt. %, in particular 0-1 wt. %.

In addition, as a composition involving various constituents, its properties are not equal to simple addition of respective constituents thereof, and are directed to interaction of respective constituents or the like. This is a very complicated issue and constitutes characteristic of chemistry science as a laboratory course. By means inventive labor, the inventors have surprisingly found that the technical problems addressed by the present disclosure can be advantageously resolved, i.e. the glass ceramic composition is able to be used for producing the machinable glass ceramic and articles thereof with excellent chemical toughening performances when $P_2O_5+Na_2O>3$ wt. % and $Al_2O_3+Na_2O+P_2O_5>17$ wt. %.

According to the present disclosure, $Al_2O_3$ and $P_2O_5$ are also important constituents for glass ceramic composition since they may facilitate the ion exchange on the glass ceramic surface. A larger exchange depth of the ion exchange is favorable for the strength and the scratch-tolerance of the glass ceramic. The inventors have surprisingly found that the strength of the machinable glass ceramic can be advantageously improved by limiting that the sum of amount of $Al_2O_3$, $Na_2O$ and $P_2O_5$ is higher than 16 wt. %, in particular higher than 17 wt. % (i.e. $Al_2O_3+Na_2O+P_2O_5>17$ wt. %). Preferably, the sum of amount of $Al_2O_3$, $Na_2O$ and $P_2O_5$ is higher than 18 wt. %, more preferably higher than 20 wt. %, for example, higher than 22 wt. %.

According to the present disclosure, as calculated from batches based on oxides, the sum of amount of $Al_2O_3$, $Na_2O$ and $P_2O_5$ is no more than 70 wt. %, preferably no more than 60 wt. %, more preferably no more than 50 wt. %, in particular no more than 46 wt. %.

The existence of Sodium ions and Potassium ions is of high importance to the ion exchange of the glass ceramic of the present disclosure. A glass ceramic without alkali oxides is not suitable for chemical toughening. Potassium ions are advantageous for the exchange depth. Therefore, $K_2O$ may be present to a specific amount within the glass ceramic composition. By means inventive labor, the inventors have surprisingly found that ion exchange can be carried out advantageously when the sum of amount of $P_2O_5$ and $Na_2O$ is higher than 3 wt. % (i.e. $P_2O_5+Na_2O>3$ wt. %). Preferably, the sum of amount of $P_2O_5$ and $Na_2O$ is higher than 5 wt. %, more preferably at least 6 wt. %.

According to the present disclosure, as calculated from batches based on oxides, the sum of amount of $P_2O_5$ and $Na_2O$ is no more than 40 wt. %, preferably no more than 30 wt. %, more preferably no more than 25 wt. %, in particular no more than 21 wt. %.

In some preferred embodiments of the present disclosure, the fluorine mica glass-ceramic composition which can be chemically toughened optionally contains $ZrO_2$, $CeO_2$ and $SnO_2$. $ZrO_2$ can be used a nucleating agent to improve harness and strength of the materials. $CeO_2$ and $SnO_2$ function as fining agents.

In some preferred embodiments of the present disclosure, the amount of $ZrO_2$ is 0-10 wt. %, preferably 0-8 wt. %, in particular 0-6 wt. %. For example, in some illustrative embodiments of the present disclosure, the amount of $ZrO_2$ is 0-0.11 wt. %. In some preferred embodiments of the present disclosure, the amount of $CeO_2$ is 0-1 wt. %, preferably 0-0.5 wt. %, more preferably 0-0.3 wt. %, in particular 0-0.2 wt. %. For example, in some illustrative embodiments of the present disclosure, the amount of $CeO_2$ is 0-0.01 wt. %. In some preferred embodiments of the present disclosure, the amount of $SnO_2$ is 0-1 wt. %, preferably 0-0.5 wt. %, more preferably 0-0.3 wt. %, in particular 0-0.2 wt. %. For example, in some illustrative embodiments of the present disclosure, the amount of $SnO_2$ is 0-0.11 wt. %. In some preferred embodiments of the present disclosure, the amounts of $ZrO_2$, $CeO_2$ and $CeO_2$ can be 0-6 wt. %, 0-0.01 wt. % and 0-0.11 wt. %, respectively.

In some preferred embodiments of the present disclosure, the glass-ceramic composition is a fluorine mica glass-ceramic composition, wherein F is present in an amount of 1-20 wt. %, preferably 1-15 wt. %, particularly preferably 2-12 wt. %, in particular 5-10 wt. %.

According to the present disclosure, mica crystalline phase can be formed in the fluorine mica glass-ceramic composition of the present disclosure and the machinable glass ceramic produced therefrom, and the glass ceramic can be chemically toughened, for example by ion exchanging. Mica is classified as a phyllosilicate; its basic structure feature is a composite sheet in which a layer of octahedrally-coordinate cations is sandwiched between two identical layers of linked $(Si, Al)O_4$ tetrahedra. The general formula of the mica structure can be found in Dana's new Mineralogy, R. V. Gaines et al., eds. (John Wiley & Sons, New York, 1997), and the structure can be written as:

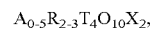

wherein,

A=a large monovalent or bivalent ion (e.g. $Na^+$, $K^+$, $Rb^+$, $Cs^+$, $Ca^{2+}$, $Sr^{2+}$, $Ba^{2+}$), or a partial vacancy (partial vacancy denoted by subscript "$_{(\ )}$"), R=an octahedrally-coordinated cation (e.g. $Li^+$, $Mg^{2+}$, $Fe^{2+}$, $Mn^{2+}$, $Zn^{2+}$, $Al^{3+}$, $Fe^{3+}$, $Mn^{3+}$, $V^{3+}$), T=a tetrahedrally-coordinated cation (predominantly $Si^{4+}$, with $Al^{3+}$ and $B^{3+}$), and X=is an anion (predominantly $OH^-$ in minerals, but $F^-$ in glass-ceramics. X may also be partially $O^{2-}$).

Micas are extremely common in rocks, and numerous classification system exist for them. In glass-ceramics, micas are typically classified as alkaline (containing alkali ions) and non-alkaline (containing no monovalent ions), and as trisilicic (wherein $T_4$ is $(Si_3Al)$) and tetrasilicic ($Si_4$). These compositional parameters can be varied to produce desired properties in a glass-ceramic. The machinable glass ceramic is based on mica crystalline phase formed.

The crystallization begins lower than 650° C. when a metastable phase forms in the magnesium-rich matrix at the interfaces of the aluminosilicate droplets (e.g. $KAlSi_2O_6$). These crystals have been identified as a body-centered cubic form of chondrodite, $Mg_3Si_4O_{10}F_2$. At approximately higher than 750° C., the chondrodite phase recrystallizes to small platy crystals of norbergite, $Mg_3Si_4O_{10}F_2$. Then phlogopite $KMg_3AlSi_3O_{12}F_2$ crystals are found to grow epitaxially on these earlier crystals, resulting in the interlocked "house-of-cards" structures from 900° C. to 1200° C.; alternatively, fluoromica crystal with preferred lateral direction or cabbage-head shape can be formed in the fluorine mica glass-ceramic and the size of crystal grains of the fluoromica crystal is >5 μm, >10 μm, or >15 μm.

The toughening process could be done by immersing glass ceramic into a salt bath which containing monovalent ions to exchange with alkali ions inside glass. The monovalent ions in the salt bath has radius larger than alkali ions inside glass. A compressive stress to the glass is built up after ion-exchange due to larger ions squeezing in the glass network. After the ion-exchange, the strength and flexibility of glass ceramic are surprisingly and significantly improved. In addition, the DoL and the CS induced by chemical toughening could increase scratch resistance of glass ceramic so that toughened glass ceramic would not get scratched easily.

The most used salt for chemical toughening is $Na^+$-containing or $K^+$-containing melted salt or mixture thereof. The commonly used salts are $NaNO_3$, $KNO_3$, $NaCl$, $KCl$, $K_2SO_4$, $Na_2SO_4$, $Na_2CO_3$, and $K_2CO_3$. Additives like NaOH, KOH and other sodium salts or potassium salts could be also used for better controlling the speed of ion-exchange, CS and DoL during chemical toughening. $Ag^+$-containing or $Cu^{2+}$-containing salt bath could be used to add anti-microbial function to glass ceramic.

In addition, the machinable glass ceramic can be chemically toughened by three steps, to increase the DoL to higher than 40 μm. The first step is to chemically toughen the glass, and the chemical-toughened layer exhibits a profile conforming to standard complementary error function. As for the samples shown in FIG. 6, the first step of chemical toughing is carried out by immersion for 0.5-6 h in a $KNO_3$ salt bath at temperatures lower than the stress temperature of the glass ceramic, and the resulted DoL conforms to typical complementary error function profile.

As used herein, the terms "error function" and "Erf" refer to the function which is twice the integral of a normalized Gaussian function between 0 and $x/\sigma\sqrt{2}$, and the terms "complementary error function" and "Erfc" are equal to one minus the error function; i.e., Erfc(x)=1−Erf (x).

K ion concentration for the first step is modeled by error-function:

$$C(x)=1-(1-C_0)erf(x/2\sqrt{Dt}) \quad (1)$$

wherein $C_0$ is the K ion concentration in the internal glass ceramic, D is the diffusion coefficient, t is the diffusion time.

Figure 6:
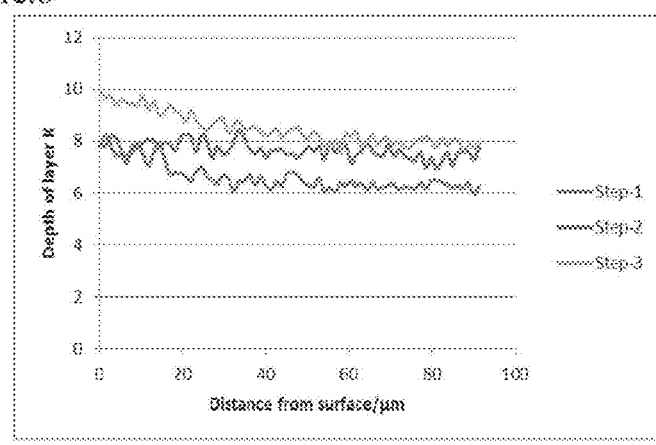
FIG. 6 shows depth of $K^+$ layer by 3 steps chemical toughening the machinable glass ceramic according to one embodiment of the present disclosure.

In the second step, the ion exchanged glass ceramic samples are heat treated at a temperature below the strain point of the glass ceramic for a desired period to promote diffusion of potassium to extend the depth of the DoL, while at the same time relaxing the surface compressive stress in the samples. The samples shown in FIG. 6, are heat treated below strain point for 0.1-10 h, which results in an extension of the DoL beyond the DoL achieved in the first step. The choice of heat treatment temperature and time depends on the rate of stress relaxation and rate of diffusion for a given glass ceramic composition at a given temperature.

Samples of K ion concentration for the second step are modeled:

$$C(x)=N/\sqrt{(\pi Dt)}\cdot e^{-x^2/4Dt} \quad (2)$$

wherein N is the K ion content of the glass ceramic, D is the diffusion coefficient, t is the diffusion time.

In the third step, a second ion-exchange for short period reestablishes the surface DoL. In FIG. 6, the second ion-exchange at temperature below the strain point of the glass ceramic for 2-200 minutes results in that the total DoL increases from 25 μm to 53 μm.

Samples of K ion concentration for the third step 3 are modeled by error-function:

$$C(x)=1-(1-C_0)erf(x/2\sqrt{Dt})+N/\sqrt{(\pi Dt)}\cdot e^{-x^2/4Dt} \quad (3)$$

The thermal shock resistance of glass ceramic is especially the most important factor for the glass ceramic, because the thermal shocking resistance determines economical availability of said toughened glass ceramic with high quality. This is also why the composition of raw glass ceramic sheet is carefully designed for each type of glass ceramic which has been already described in the past paragraphs.

The robustness of a material to thermal shock is characterized by the thermal shock resistance parameter:

$$R = \frac{\sigma(1-\mu)\lambda}{E\alpha}$$

wherein R is the thermal shock resistance; α is CTE; λ is the thermal conductivity; a is the maximal tension the material can resist, E is the Young's modulus and μ is Poisson ratio. Higher value for R represents greater resistance to thermal shock and high tolerance to temperature gradient and thermal loading. Accordingly, thermal stress resistance of the glass ceramic is determined by maximum thermal loading ΔT from the following equation:

$$\Delta T \propto \frac{2\sigma(1-\mu)}{E\alpha}$$

With no doubt glass ceramic with higher R would certainly has higher thermal loading tolerance and hence has greater resistance to thermal shock.

For the practical applications, R should be higher than 180 $W/m^2$, preferred higher than 200 $W/m^2$, preferred higher than 250 $W/m^2$. And ΔT should be higher than 300° C., preferred higher than 350° C., preferred higher than 400° C.

CTE is the key factor to fulfill the requirement of R and ΔT mentioned above for the thermal shock resistance of glass ceramic. The glass ceramic with lower CTE and Young's modulus has higher thermal shock resistance and are less prone to breakage caused by temperature gradient and has an advantage of reducing uneven distribution of thermal stress in chemical toughening process and other high temperature. CTE should be lower than $20*10^{-6}/K$, preferred lower than $18*10^{-6}/K$, preferred lower than $16*10^{-6}/K$, preferred lower than $10*10^{-6}/K$, preferred lower than $9*10^{-6}/K$.

R is calculated to evaluate the thermal shock resistance of glass ceramic without thermal shock experiment, and the accordance with experimental data is generally good. However, the thermal shocking resistance of glass will also be affected by other factors, e.g. the shape of the sample, the thickness and processing history.

ΔT is calculated from intrinsic parameters to evaluate the temperature gradient resistance of glass ceramic material without temperature difference experiment, and the accordance with experimental data is also generally good. However, the resistance to temperature difference is also highly depended on the specific conditions such as the size of glass sample, thickness of glass, and processing history of glass ceramic.

Examples

The disclosure is explained and illustrated in greater detail by the following examples, without wishing to restrict it thereby in any manner.

In general, molten mother glass is casted into desired shapes and then gradually cooled to below transformation temperature for forming. And then a two-step process is adopted to carry out crystallization: in the first step, the glass articles are heated up to about $T_g$, for example, 750-850° C., and then heat treatment for a suitable period, for example 1-6 hours, so as to ensure production of crystal nucleus in the glass liquid; and in the second step, the system is heated up to a temperature between 850° C. and 1100° C. and incubated for a suitable period, for example 1-8 hours, so as to ensure growth of crystal.

Samples for SEM test are firstly subjected to acid corrosion treatment for 5-30 minutes, and then morphology and size of the crystal are measured by means of JSM-6380 SEM.

The X-ray diffraction patterns are measured by means of an XRD instrument of DX-2007. Vickers hardness is characterized by HXD-1000™.

With the specific composition as illustrated (such as those as shown in Examples 1-12), one skilled in the art is able to select any starting materials to meet the composition as defined. In addition the processes as described above, one skilled in the art is able to select any additional suitable methods or process conditions for processing the glass-ceramic composition to produce the machinable glass ceramic without an inventive step.

In one illustrative embodiment of the present disclosure, lapping and polishing of both sides of the glass ceramic article can be performed, wherein the Hv hardness of the glass ceramic article is higher than 250 kgf/mm$^2$, preferably higher than 260 kgf/mm$^2$ and more preferably higher than 270 kgf/mm$^2$. Then the glass ceramic article can be chemically toughened in molten pure $KNO_3$ at a temperature of 390 to 450° C., the chemical toughening time could be from 1 to 10 hours, preferably from 400 to 430° C. for 5 to 8 hours, and more preferably at 420° C. for 6 hours, so that the glass ceramic article is toughened. A high strength and DoL can be achieved with a compress strength of more than 350 MPa and a DoL of more than 15 μm.

FIGS. 1 to 4 show XRD and SEM of the machinable glass ceramic (mica is formed)) according to one embodiment of the present disclosure during different stages of its production. Specifically, crystallization begins lower than 650° C. when a metastable phase forms in the magnesium-rich matrix at the interfaces of the aluminosilicate droplets ($KAlSi_2O_6$). These crystals have been identified as a body-centered cubic form of chondrodite, $Mg_3Si_4O_{10}F_2$ (see FIG. 1, by example of Example 1). At approximately higher than 750° C., the chondrodite phase recrystallizes to small platy crystals of norbergite, $Mg_3Si_4O_{10}F_2$ (see FIG. 2, by example of Example 1). Then phlogopite $KMg_3AlSi_3O_{12}F_2$ crystals are found to grow epitaxially on these earlier crystals (see FIG. 3), resulting in the interlocked "house-of-cards" structures from 900° C. to 1200° C. (see FIG. 4 (upper)) or morphology of cabbage-head shape (see FIG. 4 (middle)).

Figure 5:
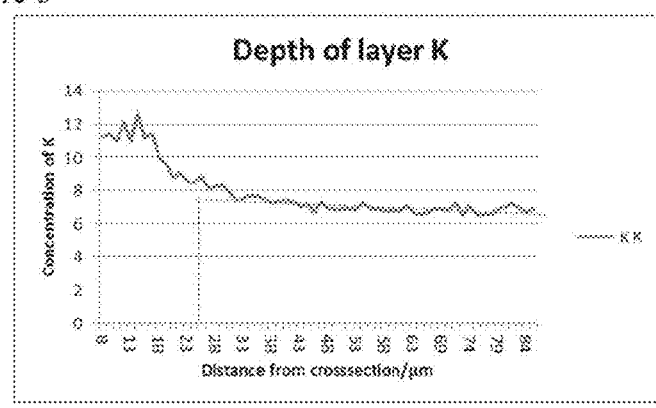
FIG. 5 shows depth of $K^+$ layer by chemical toughening the machinable glass ceramic according to one embodiment of the present disclosure.

By example of Example 1, FIG. 5 shows depth of $K^+$ layer by chemical toughening the machinable glass ceramic. In FIG. 5, the horizontal ordinate stands for the distance from cross-section (μm), and the vertical coordinate stands for the concentration of K ions. FIG. 6 shows depth of $K^+$ layer by 3 steps chemical toughening the machinable glass ceramic. Compared with FIG. 5, the DoI increases from 25 μm to 53 μm.

Table 1 below presents the data of composition and performances (DoI, Hv hardness and strength) of Examples 1-12 of the present disclosure:

TABLE 1

| composition/wt. % | Example 1 | Example 2 | Example 3 | Example 4 | Example 5 | Example 6 |
|---|---|---|---|---|---|---|
| $SiO_2$ | 45.96 | 45.96 | 43.10 | 53.47 | 59.14 | 64.38 |
| $Al_2O_3$ | 16.26 | 16.26 | 19.25 | 18.18 | 17.11 | 13.90 |
| $Na_2O$ | 3 | 7 | 5.35 | 9.62 | 10.69 | 11.76 |
| $K_2O$ | 9.25 | 7.25 | 9.62 | 7.49 | 6.42 | 5.35 |
| MgO | 14.12 | 12.12 | 8.56 | 9.62 | 10.69 | 12.83 |
| $ZrO_2$ | | | 0.11 | 0.11 | 0.11 | 0.11 |
| $CeO_2$ | | | 0.01 | 0.01 | 0.01 | 0.01 |
| $SnO_2$ | | | 0.11 | 0.11 | 0.11 | 0.11 |
| F | 6.13 | 6.13 | 6.42 | 7.49 | 8.56 | 9.62 |
| $P_2O_5$ | 3 | 3 | 2.14 | 3.21 | 2.14 | 1.07 |
| $B_2O_3$ | 2.28 | 2.28 | 5.35 | 6.42 | 7.49 | 8.56 |
| $Al_2O_3 + Na_2O + P_2O_5$ | 22.26 | 26.26 | 26.74 | 31.01 | 29.94 | 26.74 |
| $Na_2O + P_2O_5$ | 6 | 10 | 7.49 | 12.83 | 12.83 | 12.83 |
| DoI/μm (one step ion exchanging) | 20 | 25 | 28.00 | 30.00 | 32.00 | 33.00 |
| Hv/(kg/mm$^2$) (one step ion exchanging) | 260 | 265 | 278 | 300 | 316 | 320 |
| strength (3-point bending) (one step ion exchanging) (MPa) | 160 | 165 | 168 | 170 | 172 | 180 |
| DoI/μm (three steps chemical toughening) | 66 | 68 | 70 | 73 | 75 | 80 |
| Hv/(kg/mm$^2$) (three steps chemical toughening) | 350 | | 380 | | | 450 |
| 3-point bending strength (three steps chemical toughening) (MPa) | | 250 | | | | 300 |
| CTE/ppm/K | 8.76 | 8.54 | 8.22 | 8.01 | 7.56 | 7.21 |
| λ/W/mK | 1.47 | 1.47 | 1.45 | 1.46 | 1.45 | 1.42 |
| μ | 0.29 | 0.29 | 0.28 | 0.28 | 0.28 | 0.27 |

TABLE 1-continued data of composition and performances of Examples 1-12

| | | | | | | |
|---|---|---|---|---|---|---|
| R/W/m | 253 | 288 | 289 | 293 | 295 | 300 |
| ΔT/° C. | 355 | 420 | 450 | 458 | 460 | 465 |
| Dimension deviation ratio by ion exchanging | 0.03% | 0.03% | 0.04% | 0.04% | 0.05% | 0.05% |

| composition wt. % | Example 7 | Example 8 | Example 9 | Example 10 | Example 11 | Example 12 |
|---|---|---|---|---|---|---|
| $SiO_2$ | 58.71 | 62.90 | 61.22 | 41.93 | 44.45 | 45 |
| $Al_2O_3$ | 8.39 | 11.74 | 13.42 | 16.77 | 25.16 | 25.9 |
| $Na_2O$ | 5.03 | 6.71 | 8.39 | 10.06 | 13.42 | 5 |
| $K_2O$ | 8.39 | 6.71 | 5.03 | 3.35 | 2.52 | 5 |
| MgO | 4.19 | 5.87 | 7.55 | 10.90 | 16.77 | 12 |
| $ZrO_2$ | 0.10 | 0.10 | 0.10 | 0.10 | 0.10 | |
| $CeO_2$ | 0.01 | 0.01 | 0.01 | 0.01 | 0.01 | |
| $SnO_2$ | 0.10 | 0.10 | 0.10 | 0.10 | 0.10 | |
| F | 5.03 | 5.87 | 6.29 | 7.55 | 6.71 | 5 |
| $P_2O_5$ | 3.35 | 4.19 | 5.03 | 5.87 | 6.71 | 1 |
| $B_2O_3$ | 6.71 | 10.06 | 11.74 | 13.42 | 16.77 | 1 |
| $Al_2O_3 + Na_2O + P_2O_5$ | 16.77 | 22.64 | 26.84 | 32.71 | 45.29 | 31.9 |
| $Na_2O + P_2O_5$ | 8.39 | 10.90 | 13.42 | 15.93 | 20.13 | 6 |
| DoL/μm (one step ion exchanging) | 25.00 | 28.00 | 30.00 | 25.00 | 19.00 | 20 |
| Hv/(kg/mm²) (one step ion exchanging) | 255 | 265 | 270 | 276 | 258 | 280 |
| strength (3-point bending) (one step ion exchanging) (MPa) | 175 | 188 | 190 | 176 | 168 | 170 |
| DoL/μm (three steps chemical toughening) | 70 | 75 | 68 | 65 | 60 | 70 |
| Hv/(kg/mm2) (three steps chemical toughening | 350 | 380 | 400 | 420 | 350 | 360 |
| 3-point bending strength (three steps chemical toughening) (MPa) | | 280 | 300 | | | 310 |
| CTE/ppm/K | 5.67 | 6.76 | 8.56 | 9.87 | 10.02 | 9.7 |
| λ/W/mK | 1.48 | 1.46 | 1.45 | 1.46 | 1.45 | 1.45 |
| μ | 0.28 | 0.28 | 0.29 | 0.27 | 0.28 | 0.27 |
| R/W/m | 350 | 420 | 336 | 402 | 380 | 390 |
| ΔT/° C. | 650 | 800 | 667 | 750 | 680 | 760 |
| Dimension deviation ratio by ion exchanging | 0.03% | 0.02% | 0.04% | 0.04% | 0.04% | 0.04% |

As evident from Table 1, the glass ceramic according to the present disclosure is able to achieve DoL of 20 μm or higher, Hv hardness of 250 kg/mm² or higher, and strength of 160 MPa or higher.

Figure 7:
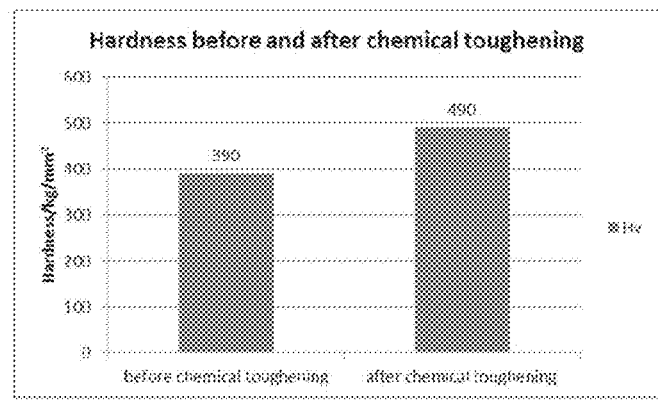
FIG. 7 shows the results of Hardness comparison before and after chemical toughening the machinable glass ceramic according to one embodiment of the present disclosure.

FIG. 7 shows the results of Hardness comparison before and after chemical toughening the machinable glass ceramic of Example 1. As shown in FIG. 7, the Hv hardness of the glass ceramic according to the present disclosure after chemical toughing is significantly improved, compared to that before chemical toughing.

Figure 8:
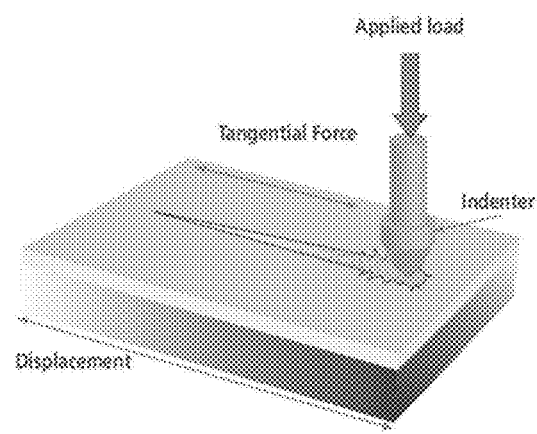
FIG. 8 shows the schematic diagram of the scratch test.

FIG. 8 shows the schematic diagram of the scratch test. As shown in this figure, an indenter is arranged vertically to the glass ceramic sample to keep the both in contact, a certain load is applied to the indenter in vertical direction, and then a tangential force is applied to the glass ceramic sample to make a displacement. Taking Example 1 as the testing target, the glass ceramic is sampled before and after chemical toughing, and the samples are respectively subjected to scratching tests under the same testing conditions.

Figure 9:
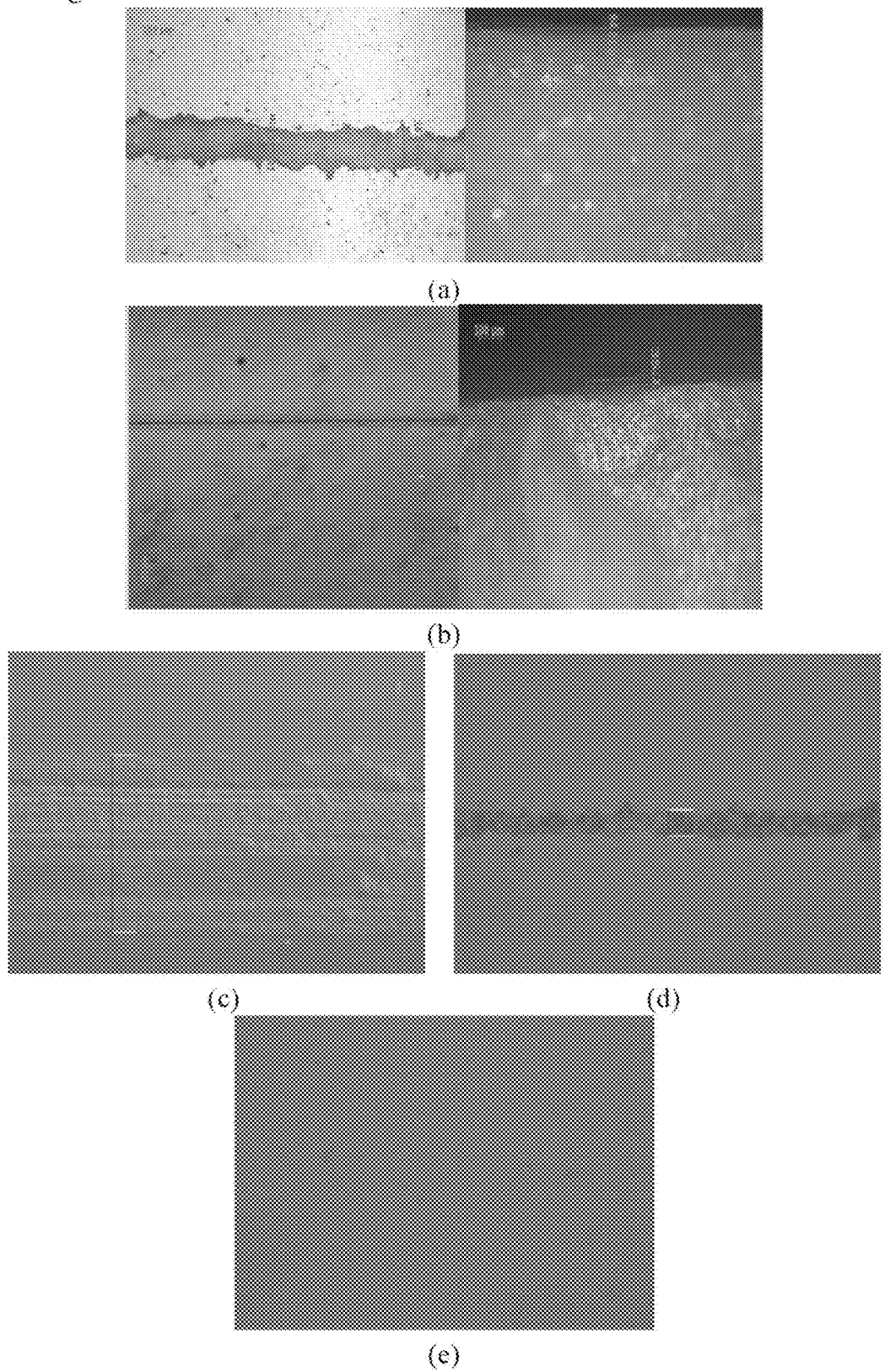
FIG. 9 shows the cross section of scratched samples (under 750 gf Moha hardness class 7) of the machinable glass ceramic according to one embodiment of the present disclosure: (a) before chemical toughening, (b) after chemical toughening. As evident from this figure, the width of scratch is reduced from 169 μm to 15 μm after chemical toughening, and the depth of scratch is reduced from 84 μm to 35 μm; and shows results of anti-scratching tests on the machinable glass ceramic according to one embodiment of the present disclosure before and after chemical toughing compared with the glass ceramic of the prior art, wherein the samples are scratched by or those (hardness is 6) under 1500 g pressure load, the machinable glass ceramic of the present disclosure exhibits better anti-scratching performances than the glass ceramic of the prior art, with the width of scratch being reduced from 1347 μm (FIG. 9(c)) to 199 μm (FIG. 9(d)), and the machinable glass ceramic of the present disclosure after the chemical toughing exhibits no scratch (FIG. 9(e)).

FIG. 9 shows the cross-section of scratched samples (under 750 gf) of the machinable glass ceramic of Example 1 of the present disclosure: (a) before chemical toughening, (b) after chemical toughening. As shown in this figure, the width of scratch is reduced from 169 μm to 15 μm after chemical toughening, and the depth of scratch is reduced from 84 μm to 35 μm, indicating that the glass ceramic according to the present disclosure is able to be chemically toughened and thus achieve significant improvement over the prior art with respect to the anti-scratching performance.

By example of ACA-2483 with the composition of Example 12 and the chemically toughened ACA-2483 (referred to as ACA2483CT hereinafter), FIG. 9 further shows results of anti-scratching tests on the machinable glass ceramic according to one embodiment of the present disclosure (MIGC) before and after chemical toughing compared with the glass ceramic of the prior art. The samples are scratched by or those (hardness is 6) under 1500 g pressure load, the machinable glass ceramic of the present disclosure, e.g. ACA-2483, exhibits better anti-scratching performances than the sample MACOR (commercially available from Corning, also referred to as CorningMACOR), with the width of scratch being reduced from 1347 μm (MACOR, FIG. 9(c)) to 199 μm (ACA-2483, FIG. 9(d)), and the sample ACA-2483 exhibits no scratch (FIG. 9(e)). That is to say, the anti-scratching performances of ACA-2483 are further improved significantly after the chemical toughing. Therefore, compared with MACOR, the machinable glass ceramic according to the present disclosure exhibits significantly improved anti-scratching performances, and the hardness and the strength are further improved by the chemical toughing.

Figure 4:
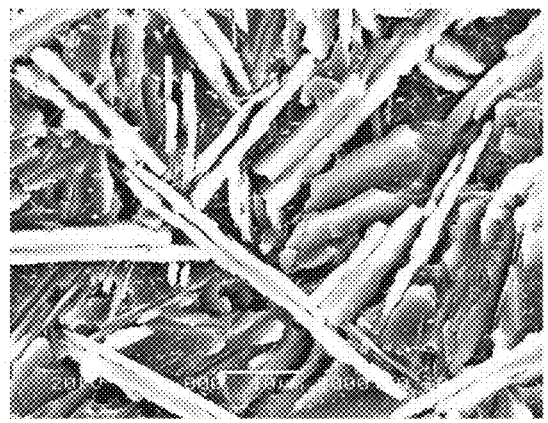
Figure 4:
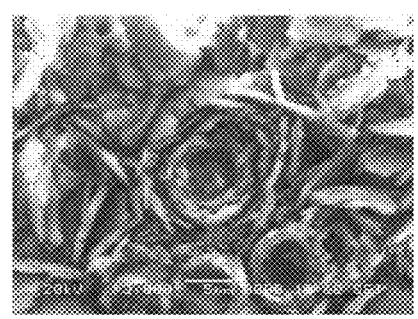
Figure 4:
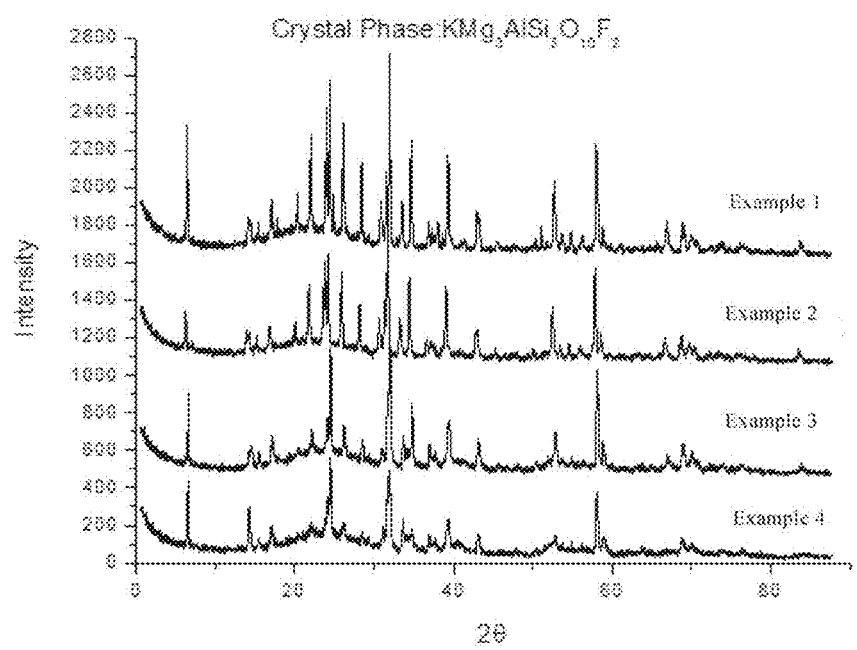
Figure 10:
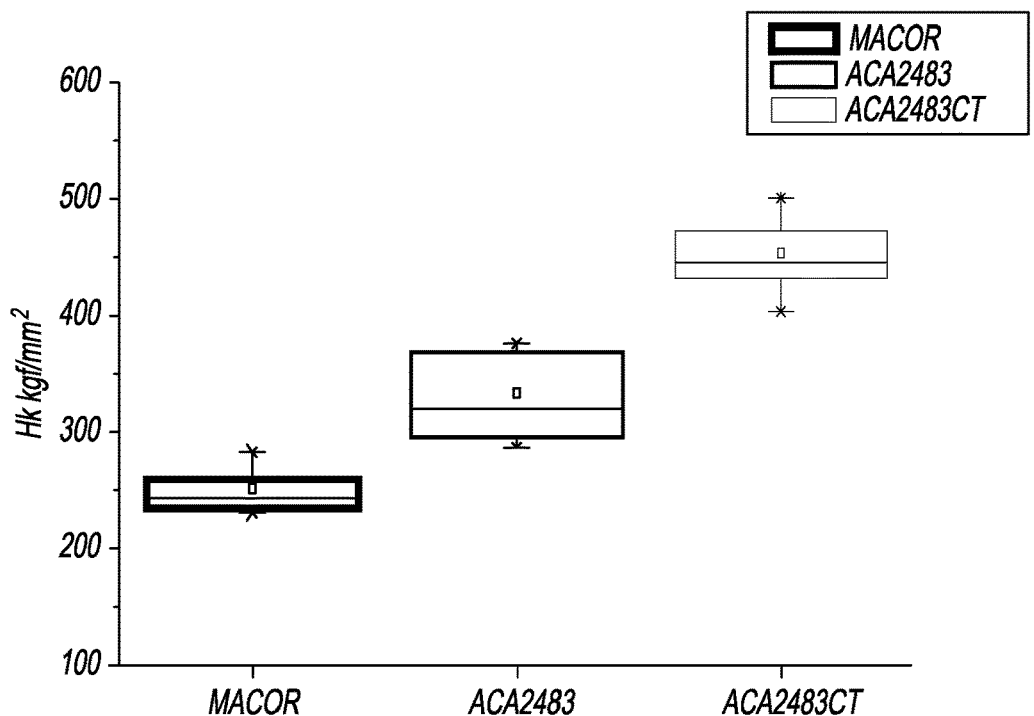
FIG. 10 shows the comparative results of Hk hardness of the machinable glass ceramic according to one embodiment of the present disclosure before and after chemical toughing compared with the glass ceramic of the prior art.

By example of ACA-2483 and ACA2483CT, FIG. 10 shows the comparative results of Hk hardness of the machinable glass ceramic according to the present disclosure with the glass ceramic of the prior art. ACA-2483 and ACA2483CT exhibits the cabbage-head shape as shown in FIG. 4. As seen from FIG. 10, in comparison with MACOR, the Hk hardness of ACA-2483 is significantly improved, and after the chemical toughing, the Hk hardness of ACA-2483CT is further improved.

Figure 11:
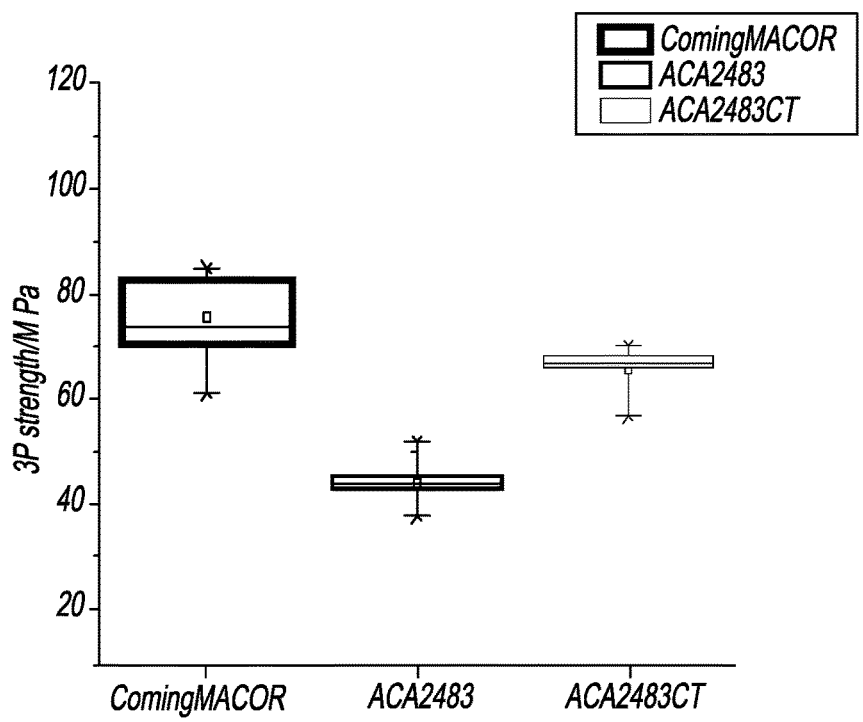
FIG. 11 shows the comparative results of 3P (three-point bending) strength of the machinable glass ceramic according to one embodiment of the present disclosure before and after chemical toughing compared with the glass ceramic of the prior art.

By example of ACA-2483 and ACA2483CT, FIG. 11 shows the comparative results of 3P (three-point bending) strength of the machinable glass ceramic according to the present disclosure compared with the glass ceramic of the prior art. As shown in FIG. 11, the 3P strength of ACA-2483 is lower than that of MACOR; whereas after the chemical toughing, the 3P strength of ACA-2483CT is significantly improved and is comparable to that of MACOR.

The abovementioned comparison definitely demonstrates that the present disclosure has achieved significant improvement over the prior art.

What is claimed is:

1. A fluorine mica glass-ceramic, comprising:
   $SiO_2$: 25-75 wt %;
   $Al_2O_3$: 6-30 wt %;
   $Na_2O$: 3-30 wt %;
   $K_2O$: 0-15 wt %;
   $B_2O_3$: 0.1-30 wt %;
   MgO: 4-35 wt %;
   CaO: 0-4 wt %;
   F: 1-20 wt %;
   $ZrO_2$: 0-10 wt %;
   $P_2O_5$: 1-10 wt %;
   $CeO_2$: 0-1 wt %;
   $SnO_2$: 0-1 wt %,
   wherein $P_2O_5+Na_2O>5$ wt %, and $Al_2O_3+Na_2O+P_2O_5>17$ wt %, and,
   wherein the glass ceramic has a microstructure comprising:
   1). a glass matrix, and
   2) at least one crystalline phase with the formula of $(K,Na)_{1-x}Mg_3(Al,B,P)_{1-x}Si_{3+x}O_{10}F_2$, where x is 0 to 1, the glass ceramic is machinable and can be ion exchanged to achieve compress stress CS >300 MPa, and Dol >15 μm.

2. The fluorine mica glass-ceramic according to claim 1, comprising the following composition, as calculated from batches based on oxides:
   $SiO_2$: 30-70 wt %;
   $Al_2O_3$: 7-29 wt %;
   $Na_2O$: 3-15 wt %;
   $K_2O$: 0.5-12 wt %;
   $B_2O_3$: 0.1-20 wt %;
   MgO: 4-25 wt %;
   CaO: 0-2 wt %;
   F: 1-15 wt %;
   $P_2O_5$: 1-9 wt %;
   $ZrO_2$: 0-8 wt %;
   $CeO_2$: 0-0.5 wt %;
   $SnO_2$: 0-0.5 wt %.

3. The fluorine mica glass-ceramic according to claim 1, comprising the following composition, as calculated from batches based on oxides:
   $SiO_2$: 35-65 wt %;
   $Al_2O_3$: 8-27 wt %;
   $Na_2O$: 3-15 wt %;
   $K_2O$: 1-11 wt %;
   $B_2O_3$: 1-20 wt %;
   MgO: 4-20 wt %;
   CaO: 0-1.5 wt %;
   F: 2-12 wt %;
   $P_2O_5$: 1-8 wt %;
   $ZrO_2$: 0-6 wt %;
   $CeO_2$: 0-0.3 wt %;
   $SnO_2$: 0-0.3 wt %.

4. The fluorine mica glass-ceramic according to claim 1, comprising the following compositions, as calculated from batches based on oxides:
   $SiO_2$: 40-65 wt %;
   $Al_2O_3$: 8-26 wt %;
   $Na_2O$: 3-14 wt %;
   $K_2O$: 2-10 wt %;
   $B_2O_3$: 1-17 wt %;
   MgO: 4-17 wt %;
   CaO: 0-1 wt %;
   F: 5-10 wt %;
   $P_2O_5$: 1-7 wt %;
   $ZrO_2$: 0-6 wt %;
   $CeO_2$: 0-0.2 wt %;
   $SnO_2$: 0-0.2 wt %.

5. The fluorine mica glass-ceramic according to claim 1, wherein the fluorine mica glass-ceramic has a porosity of 0%, has greater than 40 Vol. % of crystalline phase and interlock crystallization structure can be formed, wherein the mica crystalline size is 5-100 μm, with an aspect ratio of <0.5.

6. The fluorine mica glass-ceramic according to claim 1, having a CTE <20 ppm/K in the temperature range of 20–300° C. and a Poisson's ratio of <0.3.

7. The fluorine mica glass-ceramic according to claim 1, having a maximum thermal shock resistance ΔT>300° C., thermal conductivity lower than 1.8 W/m° C. and maximum usage temperature higher than 800° C.

8. The fluorine mica glass-ceramic according to claim 1, having the thermal shock resistance parameter R of higher than 180 W/m².

9. The fluorine mica glass-ceramic according to claim 1, having a compress stress higher than 300 MPa, a mechanical strength higher than 350 MPa, fracture modulus higher than 100 MPa, Young's modulus higher than 65 GPa, and bending strength higher than 94 MPa.

10. The fluorine mica glass-ceramic according to claim 1, having a dielectric constant in the range of 5.5-9 at 25° C. and 1 KHZ, and a loss tangent of <0.002 at 25° C. and 1 MHz.

11. The fluorine mica glass-ceramic according to claim 1, wherein the fluorine mica glass-ceramic exhibits an Hv hardness higher than 200 kg/mm².

12. The fluorine mica glass-ceramic according to claim 1, having a chemical toughening temperature from 300° C.~500° C., a chemical toughening time of $0.1^{-16}h$ in a pure $KNO_3$ salt bath.

13. The fluorine mica glass-ceramic according to claim 1, with a depth of K ion layer >15 μm, and a compress stress >300 MPa.

14. The fluorine mica glass-ceramic according to claim 1, wherein the hardness of chemically toughened machinable glass ceramic can be improved by higher than 20% after chemical toughening.

15. The fluorine mica glass-ceramic according to claim 1, having a dimension deviation ratio of the fluorine mica glass ceramic that is less than 0.06%, which is caused by chemical toughening.

16. The fluorine mica glass-ceramic according to claim 1, having widths and depths of scratches that are reduced by higher than 10% after chemical toughening.

17. The fluorine mica glass-ceramic according to claim 1, that is chemically toughened by three steps.

18. The fluorine mica glass-ceramic according to claim 17, wherein the first step produces a $Dol_1$, and the $Dol_1$ varies according to a first function; the second step produces a Dole, and the Dole varies according to a second function, and wherein the first function is different from the second function; and the third step produces $Dol_3$, and the $Dol_3$ varies according to a third function, and wherein the third function is different from the first function and the second function.

19. The fluorine mica glass-ceramic according to claim 18, wherein the first function is a first complementary error function.

20. The fluorine mica glass-ceramic according to claim 18, wherein the second function is a second complementary error function.

21. The fluorine mica glass-ceramic according to claim 18, wherein for the first step, a chemical toughening temperature is 300° C.~500° C., a chemical toughening time is 0.1~16h in a pure $KNO_3$ salt bath.

22. The fluorine mica glass-ceramic according to claim 18, wherein for the second step, a heat treatment temperature is 200~600° C. and a treatment time is 0.1~10h.

23. The fluorine mica glass-ceramic according to claim 18, wherein for the third step, a chemical toughening temperature is 300° C.~500° C., a chemical toughening time is 0.01~16h in a pure $KNO_3$ salt bath.

24. The fluorine mica glass-ceramic according to claim 1, wherein the fluorine mica glass-ceramic can be chemically toughened by multiple steps, to achieve a depth of K ion layer >40 μm, and a compress stress >300 MPa.

25. The fluorine mica glass-ceramic according to claim 1, wherein the hardness of machinable glass ceramic can be improved by higher than 30% after multiple chemical toughening steps.

26. The fluorine mica glass-ceramic according to claim 1, wherein the dimension deviation ratio of the machinable glass ceramic is less than 0.06% after multiple chemical toughening steps.

27. The fluorine mica glass-ceramic according to claim 1, wherein the widths and depths of scratches can be reduced by higher than 15% after multiple chemical toughening steps.

28. The fluorine mica glass-ceramic according to claim 1, which can be chemical toughened by $AgNO_3$ to get the antimicrobial properties and can be colorized by kinds of coloring ions (e.g. $Cu^{2+}$, $Fe^{2+}$, $Co^{3+}$, $Ni^{4+}$ and $Cr^{3+}$).

29. The fluorine mica glass-ceramic according to claim 1, wherein the fluorine mica glass-ceramic, which can be chemically toughened, can be used for providing insulation and tighten performance in high-end equipment, holders in the equipment, or a backside cover/frame on electronic products.

30. A fluorine mica glass-ceramic, comprising:
$SiO_2$: 25-75 wt %;
$Al_2O_3$: 6-30 wt %;
$Na_2O$: 3-30 wt %;
$K_2O$: 0-15 wt %;
$B_2O_3$: 0.1-30 wt %;
MgO: 4-35 wt %;
CaO: 0-4 wt %;
F: 1-20 wt %;
$ZrO_2$: 0-10 wt %;
$P_2O_5$: 0.1-10 wt %;
$CeO_2$: 0-1 wt %;
$SnO_2$: 0-1 wt %,
wherein $P_2O_5+Na_2O>3$ wt %, and $Al_2O_3+Na_2O+P_2O_5>17$ wt %,
wherein the fluorine mica glass-ceramic has a porosity of 0%, has greater than 40 Vol. % of crystalline phase and interlock crystallization structure can be formed, wherein the mica crystalline size is 5-100 μm, with an aspect ratio of <0.5, and
wherein the glass ceramic has a microstructure comprising:
1). a glass matrix, and
2) at least one crystalline phase with the formula of $(K,Na)_{1-x}Mg_3(Al,B,P)_{1-x}Si_{3+x}O_{10}F_2$, where x is 0 to 1, the glass ceramic is machinable and can be ion exchanged to achieve compress stress CS >300 MPa, and Dol >15 μm.

31. A fluorine mica glass-ceramic, comprising:
$SiO_2$: 25-75 wt %;
$Al_2O_3$: 6-30 wt %;
$Na_2O$: 3-30 wt %;
$K_2O$: 0-15 wt %;
$B_2O_3$: 0.1-30 wt %;
MgO: 4-35 wt %;
CaO: 0-4 wt %;
F: 1-20 wt %;
$ZrO_2$: 0-10 wt %;
$P_2O_5$: 0.1-10 wt %
$CeO_2$: 0-1 wt %;
$SnO_2$: 0-1 wt %,
wherein $P_2O_5+Na_2O>5$ wt %, and $Al_2O_3+Na_2O+P_2O_5>17$ wt %, and,
wherein the glass ceramic has a microstructure comprising:
1). a glass matrix, and
2) at least one crystalline phase with the formula of $(K,Na)_{1-x}Mg_3(Al,B,P)_{1-x}Si_{3+x}O_{10}F_2$, where x is 0 to 1, the glass ceramic is machinable and can be ion exchanged to achieve compress stress CS >300 MPa, and Dol >15 μm,
wherein the fluorine mica glass-ceramic exhibits an Hv hardness higher than 200 kg/mm².

\* \* \* \* \*